No. 614,934. Patented Nov. 29, 1898.
E. G. CLYMANS.
THRESHING MACHINE.
(Application filed Dec. 17, 1897.)
(No Model.) 5 Sheets—Sheet 1.

WITNESSES
INVENTOR
Ezra G. Clymans
by Herbert W. Jenner.
Attorney

No. 614,934. Patented Nov. 29, 1898.
E. G. CLYMANS.
THRESHING MACHINE.
(Application filed Dec. 17, 1897.)
(No Model.) 5 Sheets—Sheet 2.
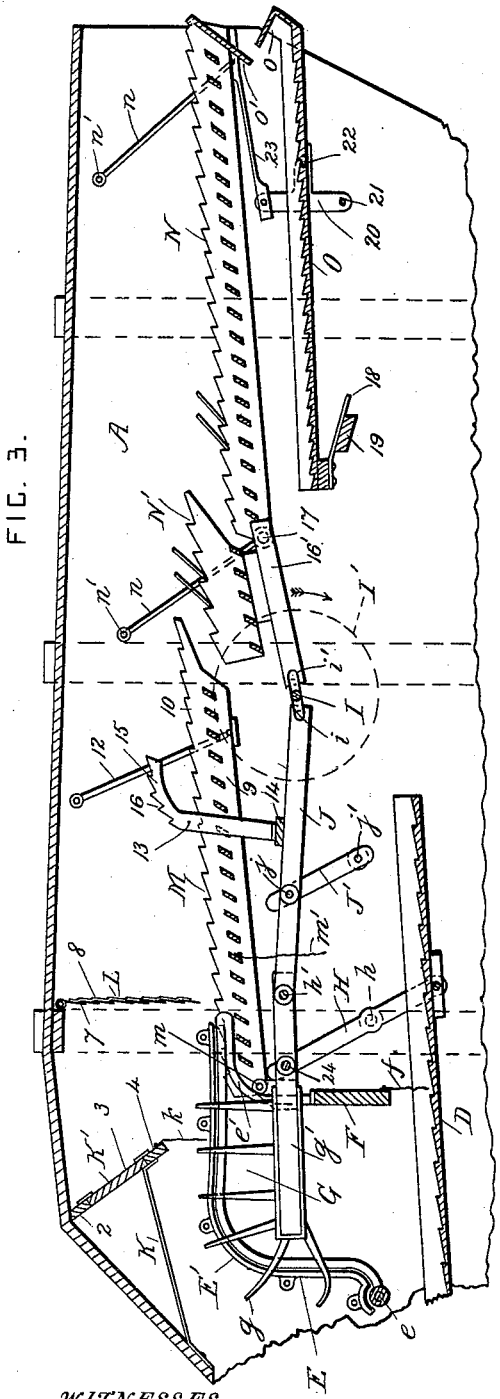
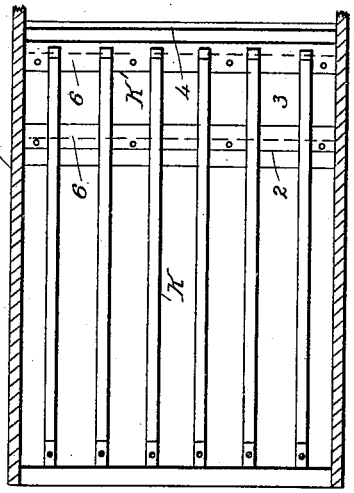
WITNESSES
INVENTOR
Ezra G. Clymans
by Herbert W. T. Jenner
Attorney

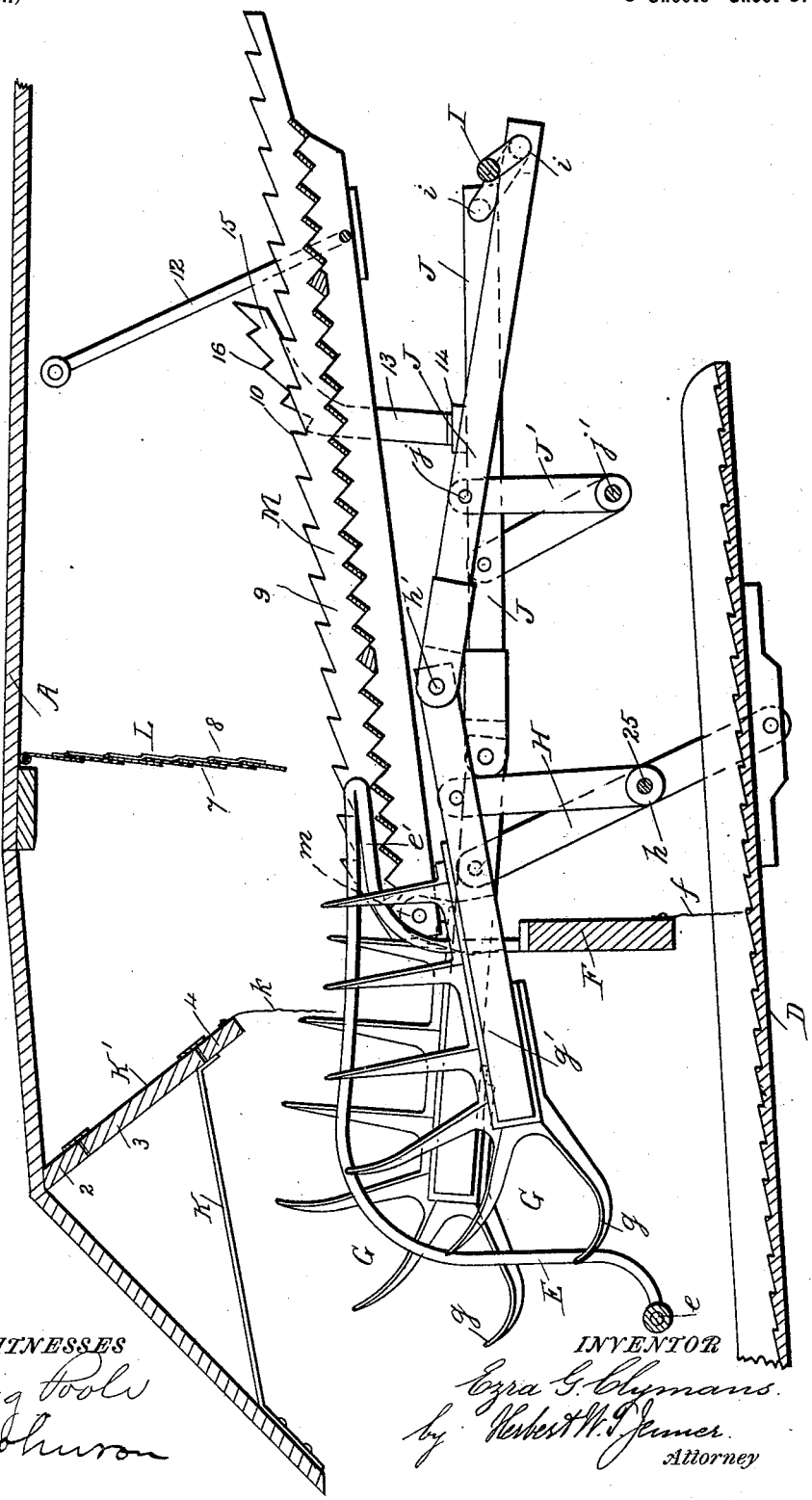

No. 614,934. Patented Nov. 29, 1898.
E. G. CLYMANS.
THRESHING MACHINE.
(Application filed Dec. 17, 1897.)
(No Model.) 5 Sheets—Sheet 4.

WITNESSES  INVENTOR
Ezra G. Clymans
by Herbert W. T. Jenner
Attorney

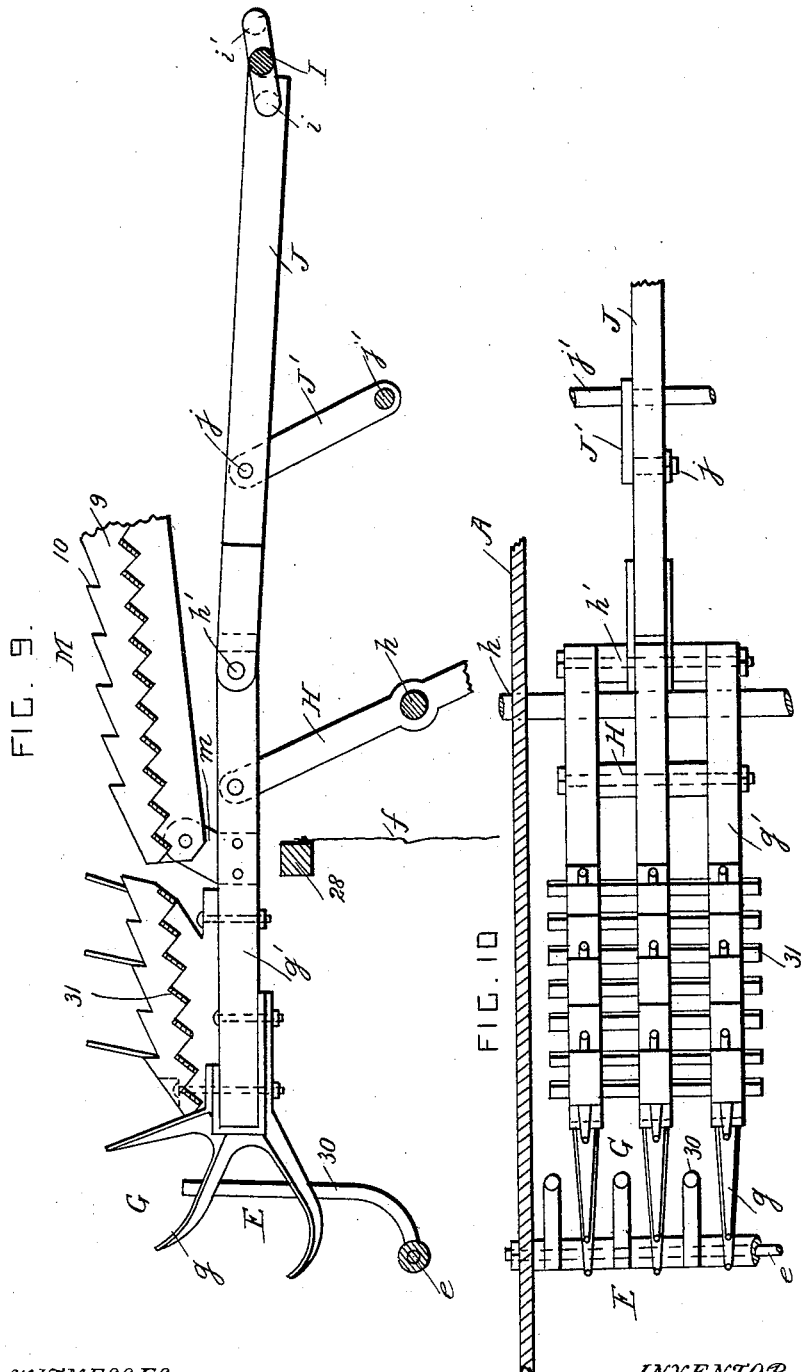

UNITED STATES PATENT OFFICE.

EZRA G. CLYMANS, OF WAYNESBOROUGH, PENNSYLVANIA, ASSIGNOR TO THE GEISER MANUFACTURING COMPANY, OF SAME PLACE.

THRESHING-MACHINE.

SPECIFICATION forming part of Letters Patent No. 614,934, dated November 29, 1898.

Application filed December 17, 1897. Serial No. 662,293. (No model.)

*To all whom it may concern:*

Be it known that I, EZRA G. CLYMANS, a citizen of the United States, residing at Waynesborough, in the county of Franklin and State of Pennsylvania, have invented certain new and useful Improvements in Threshing-Machines; and I do hereby declare the following to be a full, clear, and exact description of the invention, such as will enable others skilled in the art to which it appertains to make and use the same.

This invention relates to threshing-machines; and it consists in the novel construction and combination of the parts hereinafter fully described and claimed.

Figure 1:
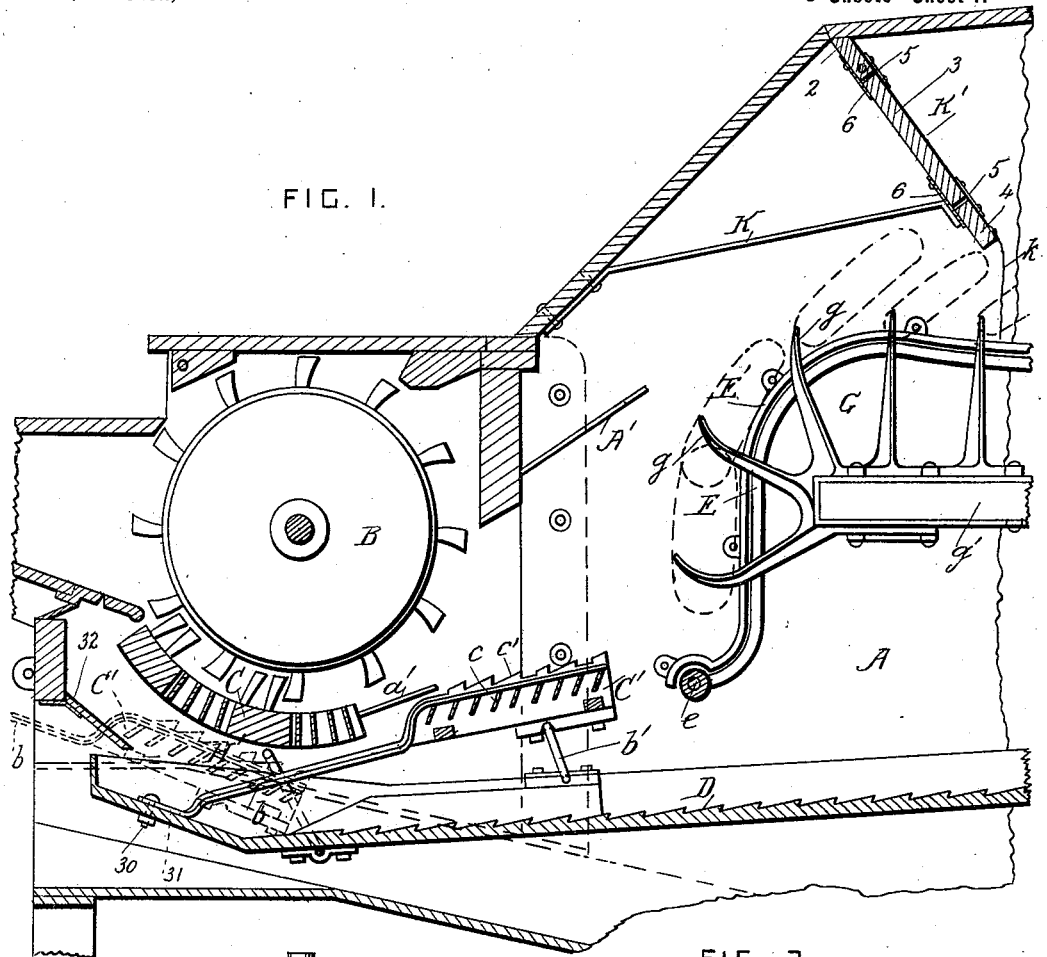
Figure 2:
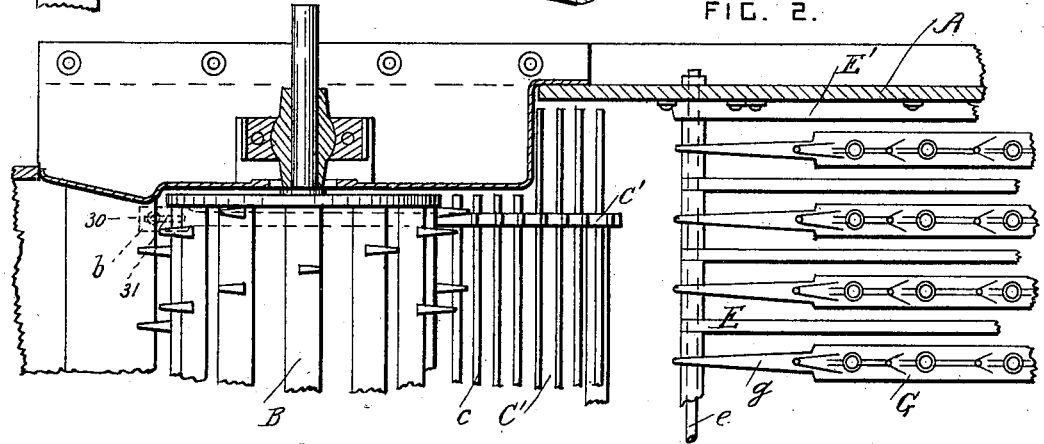
Figure 7:
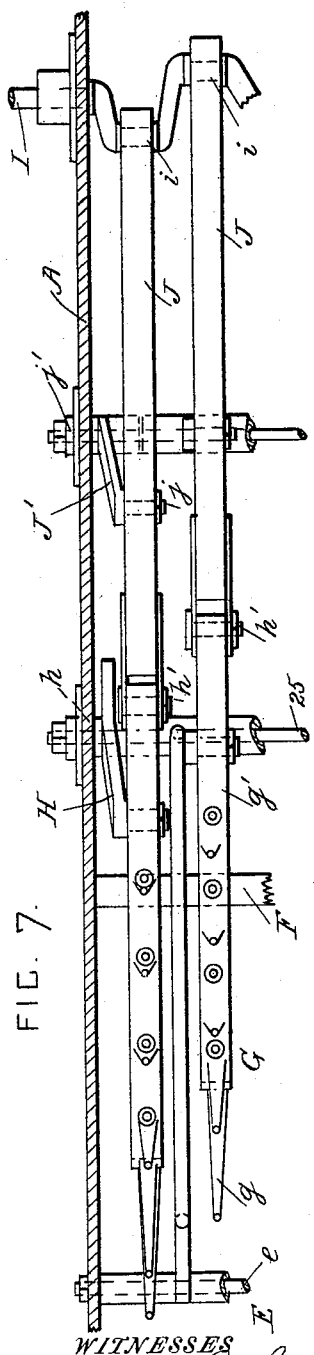
Figure 8:
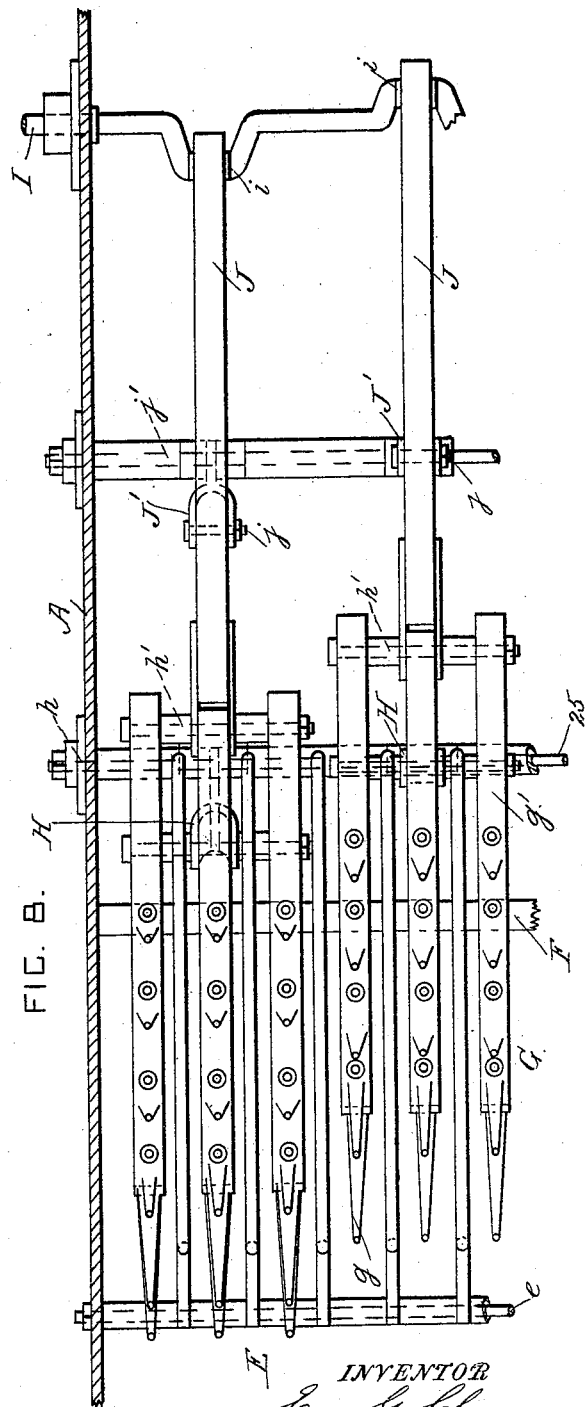

In the drawings, Figure 1 is a longitudinal section through the front part of the threshing-machine, showing the grate under the cylinder. Fig. 2 is a partial plan view of the same. Fig. 3 is a longitudinal section through the middle and end parts of the threshing-machine, showing the straw-shaking mechanism and drawn to a smaller scale. Fig. 4 is a partial plan view of the same. Fig. 5 is a plan view from below of the inclined deflector and spring-fingers. Fig. 6 is a detail side view of the straw-rakes and the front straw-shaker, showing a modification. Fig. 7 is a partial plan view of the same. Fig. 8 is a partial plan view showing a second modification of the straw-rakes. Fig. 9 is a detail side view showing a third modification of the straw-rakes. Fig. 10 is a partial plan view of the same.

A is the casing of the threshing-machine, and B is the cylinder, provided with teeth in the usual manner.

C is the concave supported under the cylinder.

D is the grain-bottom for catching the grain and carrying it to the rear part of the machine.

C' is a grate supported in the grain-bottom behind the concave. This grate is provided with cross-slats $c$ of any approved form and arrangement and has longitudinally-arranged ratchet-shaped teeth $c'$ for working the straw rearwardly. The grain is free to drop between the slats into the grain-bottom. A row of teeth $a'$ is arranged to project from the concave for guiding the straw onto the grate.

One or more similar arms $b$ extend forwardly from the grate under the concave and are secured to the grain-bottom, where they can be reached from the front end of the machine.

The grate is supported by similar links $b'$, which are pivoted to it and which engage with notches in the grain-bottom, so that the grate is held in the required position. The position of the grate can be adjusted, if desired, by moving it longitudinally on its pivoted links before securing the arm or arms $b$ to the grain-bottom.

A bolt 30 is shown as one means for securing the grate rigidly to the grain-bottom, and a slot 31 is shown in the arm as one means for permitting the position of the grate to be adjusted. The guide-board 32 is removed when it is desired to take out the grate. The dotted lines in Fig. 1 show one position the grate assumes under the concave when being removed from the grain-bottom.

It is difficult to obtain access to a grate behind the concave; but this grate can be removed for inspection or repair by taking out the bolt which secures the arm $b$ to the grain-bottom and pulling the arm forward. The pivoted links turn and permit the grate to drop into the grain bottom, so that the grate can be drawn forward under the concave.

A' are teeth projecting from the cross-piece behind the upper part of the cylinder for pressing the straw downward.

E is a grate behind the cylinder. This grate consists of longitudinally-arranged bars, the front ends of which are secured to a cross-bar $e$ near the grate C'. The grate-bars rise abruptly and are curved over backward. The rear end portions $e'$ of the grate-bars are preferably recurved and bent downward and are secured to the guard-board F or to any equivalent support.

A splash-curtain $f$ depends from the guard-board F into the grain-bottom. The side bars E' of the grate E are similar to the inner grate-bars in form, but are secured to the casing A, so that straw cannot become wedged between the side bars of the grate and the casing. The inner grate-bars are preferably round in cross-section, so that they will not stop the grain which flies from between the cylinder and concave.

G are the straw-rakes or lifting devices, provided with teeth $g$ at their front parts, which project between the bars of the grate E. The shanks $g'$ of the rakes G project over the top of the guard-board and are pivoted to the tops of similar links H, which are pivoted at $h$ to the casing behind the guard-board. The pins or the shaft carried by the upper parts of these links form movable fulcrums for the straw-rakes.

The rear part of the grain-bottom D is pivoted to the lower parts of the links H, and the front part of the grain-bottom is pivoted to two similar links H', which are also pivoted to the casing. The links H and H' are downwardly and rearwardly inclined, so that the grain-bottom may receive the tossing motion necessary to work the grain rearward over its surface.

I is a crank-shaft provided with cranks $i$ and $i'$ and journaled in the middle part of the casing. This crank-shaft is provided with means for revolving it in the direction of the arrow in Fig. 3, such as a belt-pulley I'.

J are similar connecting-rods operated by the cranks $i$ and pivoted to the rear end portions of the shanks $g'$ of the straw-rakes by pins $h'$.

J' are two similar links pivoted to the front portions of the connecting-rods J by pins $j$ and pivoted to the casing by pins $j'$. The links J' are arranged substantially parallel with the links H and in a position that will enable them to give the requisite motion to the points of the teeth $g$. The motion of the points of the teeth is indicated diagrammatically by dotted lines in Fig. 1, and the action of the rakes is to raise the straw step by step with a jerking motion and deliver it onto the front straw-shaker.

K are spring-fingers secured to the casing over the grate E.

K' is a rearwardly and downwardly inclined deflector pivoted to the casing over the said grate E. The deflector K' is made in three parts, of which the upper part 2 is secured to the casing. The middle part 3 is hinged to the upper part and the lower part 4 is hinged to the middle part. The hinges 5, which are preferably of leather, are attached to the rear side of the deflector, and the joints at its front side are protected by spring-plates 6, which overlap them and permit the said parts to move upwardly and rearwardly.

The spring-fingers K are arranged longitudinally in a series and perform the double function of pressing the straw downward onto the grate E and of supporting the hinged parts of the deflector K'. A splash-curtain $k$, of flexible material, depends from the lower part 4 and prevents grain from flying over the grate E.

L is a deflector which is suspended from the top of the casing over the rear portion of the grate E and which operates to depress the straw and to stop any flying grain which may be driven past the deflector K'. The deflector L preferably consists of overlapping metallic plates 7, having their upper parts secured to flexible connections 8, such as leather straps.

M is the front straw-shaker, preferably formed of side bars 9, having ratchet-shaped teeth 10 on their upper edges and inclined cross-slats secured between the said side bars. The straw-shaker M may, however, be of any other approved construction which will enable it to shake the loose grain out of the straw. The front end of the straw-shaker M is pivoted to brackets $m$, which are secured to the straw-rakes in front of the links H. The rear end of the straw-shaker M is supported by similar downwardly and rearwardly inclined links 12, which are pivoted to the casing. A splash-curtain $m'$, of flexible material, is suspended from the straw-shaker M to stop any grain which may fly over the top of the guard-board F.

Straw-lifters 13 are supported by the connecting-rods J between the cranks and the pins $j$. A cross-bar 14 is secured to the connecting-rods and has the straw-lifters 13 fastened to it at intervals. The straw-lifters project through openings in the straw-shaker and have upwardly and rearwardly inclined top portions 15, provided with ratchet-shaped teeth 16. The function of the straw-lifters is to raise the straw on the end portion of the straw-shaker periodically without arresting its rearward travel. The straw-lifters have greater upward motion than the straw-shaker and they prevent the straw from becoming matted on the straw-shaker.

N is the rear straw-shaker, carried by similar rearwardly and downwardly inclined links $n$, which are pivoted to the casing by pins $n'$. The rear straw-shaker is of any approved construction, and preferably consists of toothed side bars and inclined cross-slats, like the front straw-shaker M. The rear straw-shaker is operated from the cranks $i'$ on the crank-shaft I by means of connecting-rods 16', which are pivoted to the front end of the said straw-shaker by pins 17.

An intermediate straw-shaker N' is carried by the connecting-rods 16' and is arranged between the straw-shakers M and N. The straw-shaker N' is preferably constructed of toothed side bars and inclined cross-slats in the same manner as the straw-shakers M and N, but it may be of any other approved construction. The shaker N' is arranged above the level of the connecting-rods, and its rear end portion projects over the front end portion of the shaker N.

O is a return-bottom supported under the rear straw-shaker. This return-bottom preferably has a corrugated bottom; but it may be of any approved construction. A pocket $o$, having an overhanging top, is formed at the rear end of the return-bottom to prevent anything from being blown out of it, and $o'$ is a downwardly and rearwardly inclined guide-board at the rear end of the rear straw-shaker for the purpose of guiding grains into the pocket o and preventing anything from being blown out of the machine over the top of the said pocket. The guide-board o' is arranged substantially parallel with the slats of the straw-shaker and projects below their bottom edges.

The downwardly-projecting board o' and the upwardly-projecting portion at the rear end of the return-bottom are arranged in proximity to each other, and one preferably overlaps the other slightly, so as to obstruct the space between the rear end portions of the shaker and return-bottom, thereby preventing the grain from being blown rearwardly between them and wasted. This construction is of importance when a pneumatic straw-stacker is used, as the same has a tendency to draw the grain rearwardly through any free and open passage or space between the rear end portions of the shaker and the return-bottom under it.

The front end of the return-bottom O is provided with downwardly and rearwardly inclined bars 18, which rest upon similar plates or blocks 19, secured to the casing. The rear part of the return-bottom O is supported by two similar bell-crank levers 20, which are pivoted to the casing by pins 21, arranged below the return-bottom. The horizontal arms of the bell-crank levers are pivoted to the return-bottom by pins 22. The upper ends of the bell-crank levers above the return-bottom are connected to the rear straw-shaker by means of two similar connecting-rods 23, arranged in any approved manner.

The object of driving the straw-rakes from cranks arranged at the middle part of the machine is to simplify the construction and to do away with all revolving shafts or other revolving mechanism in front of the guard-board and other places where straw can get and cause trouble when it accumulates by lapping and winding around said revolving parts.

The grain is collected by the grain-bottom and the return-bottom and is delivered by them to the grain-cleaning mechanism, which is not shown in the drawings, and the straw is discharged by the rear straw-shaker at the rear end of the machine.

In carrying out this invention the construction of the straw-rakes may be variously modified. In the form shown in Figs. 1 to 4 the straw-rakes are all connected together and their shanks are pivoted on a shaft 24, which extends between the links H and constitutes the movable fulcrums of all the rakes. In this form the straw-rakes operate step by step intermittently on the straw, as they all move at once in the same direction. The crank-shaft has only four cranks, two, $i$, for the front shaker and two, $i'$, for the rear shaker.

In the modification shown in Figs. 6 and 7 the straw-rakes are not connected together. Each straw-rake is pivoted to a separate link and the links are pivoted on a shaft 25, which extends crosswise of the casing. A separate crank and connecting-rod is provided for each straw-rake and the cranks are arranged at different angles, so as to operate each alternate straw-rake in a similar manner, thereby raising the straw in a substantially continuous stream. Each connecting-rod has its movable fulcrum on a separate supporting or guide link at its front end, and these links are pivoted on a shaft which extends crosswise of the casing. The front straw-shaker is of course connected to two of the straw-rakes which have a simultaneous and similar motion. The teeth of the straw-rakes also are modified in form, the rear teeth (shown in Fig. 1) being removed and a plate provided with ratchet-shaped teeth substituted for them and accomplishing the same purpose.

In the modification shown in Fig. 8 the straw-rakes are coupled together in sets of three, and each set is provided with a separate crank and connecting-rod for operating it, the cranks being arranged in different positions, so that the sets of rakes will not all work in the same direction.

In the modification shown in Figs. 9 and 10 the guard-board is reduced to a mere bar 28, to which the splash-curtain or guard is hung. The grate E is reduced to a mere series of vertical bars 30, projecting upwardly between the front teeth of the rakes and not continued horizontally over the rakes. The deep and strong guard-board is not required, as the bar 28 does not have to support the rear part of a grate, and can therefore be made light. The straw-rakes are here arranged in sets of three, the fulcrums of which are all on the same pin or shaft, but it is obvious that they might all be connected together, as shown in Fig. 1. The straw-rakes are provided with inclined cross-slats 31, which are arranged crosswise similar to the cross-slats of the straw-shakers. These cross-slats 31 prevent the straw from dropping between the rakes, so that grate-bars are not required except at the front of the straw-rakes, where they prevent the straw from being forced under the rakes when the latter are raised.

All the various modifications of the straw-rakes are operated by means of a crank-shaft and connecting-rods arranged behind them in the middle part of the machine-casing, where the straw cannot accumulate and wind upon the revolving shaft.

What I claim is—

1. In a threshing-machine, the combination, with a grain-bottom, of a grate provided with an arm extending forwardly under the concave, a detachable fastening device rigidly connecting the said arm and grate to the grain-bottom, and a support for the rear end of the said grate carried by the said grain-bottom and permitting the plate to be moved longitudinally when the said arm is disconnected from the grain-bottom, substantially as set forth.

2. In a threshing-machine, the combination, with a grain-bottom, of a grate provided with an arm extending forwardly under the concave, means for detachably connecting the said arm to the grain-bottom, and means for pivotally supporting the rear end of the said grate from the grain-bottom, said grate being adjustable and also freely removable when its said arm is disconnected from the grain-bottom, substantially as set forth.

3. In a threshing-machine, the combination, with a grain-bottom, of a grate provided with an arm extending forwardly under the concave, means for detachably connecting said arm to the grain-bottom, and links pivoted to the grate and to the grain-bottom and supporting the rear part of the grate, substantially as set forth.

4. In a threshing-machine, a deflector comprising a stationary upper part, a middle part hinged to the upper part, a lower part hinged to the middle part, and spring guard-plates of flexible material secured to the front sides of the said upper and middle parts respectively, and bearing constantly and tightly against the said middle and lower parts in all positions of said parts, whereby the joints between the said parts cannot become obstructed, substantially as set forth.

5. In a threshing-machine, the combination, with a deflector hinged to the casing, of a series of spring-fingers secured to the casing at one end in front of the said deflector and operating to depress the straw and to support the deflector in an inclined position, substantially as set forth.

6. In a threshing-machine, the combination with a deflector formed of plates hinged together and having a space between their adjacent edges when out of line with each other; of a guard of flexible material secured to the front of the upper plate and overlapping the said space and bearing against the lower plate in all its positions, whereby the said space cannot become obstructed, substantially as set forth.

7. In a threshing-machine, the combination, with a grate, of a straw-rake provided at its front part with teeth which project through the grate, a pivoted link pivotally supporting the middle part of the rake, a crank, and a rod pivotally connecting the said crank with the rear part of the rake, substantially as set forth.

8. In a threshing-machine, the combination, with a grate, of a straw-rake provided with teeth at its front part which project through the grate, a movable fulcrum at the middle part of the rake, and operating mechanism connected to the rear part of the said rake, substantially as set forth.

9. In a threshing-machine, the combination, with a straw-rake, of a movable fulcrum at the middle part of the said rake, a crank and connecting-rod connected to the rear part of the said rake, and a movable fulcrum at the middle part of the said connecting-rod, substantially as set forth.

10. In a threshing-machine, the combination, with straw-rakes, of a single set of movable fulcrums at the middle parts of the said rakes, a crank-shaft provided with cranks arranged at different angles, and connecting-rods connected to the said cranks and to the rear parts of the said straw-rakes, whereby some of the rakes alternate with others in raising the straw, substantially as set forth.

11. In a threshing-machine, the combination, with straw-rakes coupled together in sets, of movable fulcrums at the middle parts of the said sets of rakes, each said set of rakes being provided with a single fulcrum, a crank-shaft provided with cranks arranged at different angles, and connecting-rods connected to the said cranks and to the rear parts of the said sets of rakes, substantially as set forth.

12. In a threshing-machine, the combination, with a grate, and a guard for stopping the flying grain arranged behind the said grate; of a straw-rake working over the said guard and having its front part projecting through the said grate, a movable fulcrum at the middle part of the said rake to the rear of the said guard, and operating mechanism connected to the rear part of the said rake, substantially as set forth.

13. In a threshing-machine, the combination, with a grain-bottom, a grate, and a straw-rake provided at its front part with teeth which project through the grate; of links having their middle parts pivoted to a stationary support and having their lower parts pivotally connected with the said grain-bottom, a movable fulcrum arranged at the middle part of the said rake and connecting it with the upper parts of the said links, a crank, and a rod pivotally connecting the said crank with the rear part of the said rake, substantially as set forth.

14. In a threshing-machine, the combination, with a transverse guard-board, of a grate having an extension projecting rearwardly over the guard-board, a straw-rake projecting forwardly over the said guard-board and provided with teeth which project upwardly through the said grate and drag the straw to the rear, and means for operating the said rake arranged to the rear of the said guard-board, substantially as set forth.

15. In a threshing-machine, the combination, with a grate, of straw-rakes provided with teeth at their front ends which project through the said grate, cross-slats carried by the said rakes behind the said teeth, movable fulcrums at the middle parts of the said rakes, and operating mechanism connected to the rear parts of the said rakes, substantially as set forth.

16. In a threshing-machine, the combination, with straw-rakes, movable fulcrums at the middle parts of the said rakes, and operating mechanism connected to their rear parts;

of a straw-shaker having its front end portion connected to the said rakes, substantially as set forth.

17. In a threshing-machine, the combination, with straw-rakes, movable fulcrums at the middle parts of the said rakes, and cranks and connecting-rods engaging with their rear parts; of a straw-shaker having its front end portion connected to the said rakes, and means for lifting the straw carried by the said connecting-rods and projecting upwardly through the said straw-shaker, substantially as set forth.

18. In a threshing-machine, the combination, with straw-rakes, movable fulcrums at the middle parts of the said rakes, and cranks and connecting-rods engaging with their rear parts; of a straw-shaker having its front end portion connected to the said rakes, and straw-lifters carried by the said connecting-rods and projecting upwardly through the said straw-shaker, said straw-lifters having toothed top portions which are inclined upwardly and rearwardly, substantially as set forth.

19. In a threshing-machine, the combination, with straw-rakes, movable fulcrums at the middle parts of the said rakes, and cranks and connecting-rods engaging with their rear parts; of a straw-shaker having its front end portion pivoted to the said rakes in front of their fulcrums, movable fulcrums for the said connecting-rods, and means for lifting the straw carried by the said connecting-rods between their fulcrums and cranks and projecting upwardly through the said straw-shaker, substantially as set forth.

20. In a threshing-machine, the combination, with a crank-shaft arranged at the middle part of the machine; of straw-rakes, movable fulcrums at the middle parts of the said straw-rakes, a front straw-shaker having its front end portion pivoted to the said rakes, a rear straw-shaker, and connecting-rods operated by the said crank-shaft and connected to the rear end portions of the said rakes and to the front end portion of the said rear straw-shaker, substantially as set forth.

21. In a threshing-machine, the combination, with a rear straw-shaker, and means for supporting it; of cranks and connecting-rods engaging with the front end portion of the said rear straw-shaker, and a straw-shaker carried by the said connecting-rods and partially overlapping the rear straw-shaker substantially as set forth.

22. In a threshing-machine, the combination, with an inclined return-bottom provided at its rear and upper end with a pocket having an overhanging top, of a straw-shaker provided with slats and having a guide-board at its rear end which projects below the bottom edges of the said slats and overlaps the said top so that the grain is caught in the pocket and is not blown out rearwardly between the straw-shaker and the return-bottom, substantially as set forth.

23. In a threshing-machine, the combination, with a straw-shaker provided with a downwardly-projecting portion at its rear part, of a return-bottom having an upwardly-projecting portion at its rear part, said projecting portions being arranged in proximity to each other and obstructing the space between the said shaker and return-bottom, thereby preventing grain from being wasted, substantially as set forth.

24. In a threshing-machine, the combination, with a straw-shaker provided with a downwardly-projecting board at its rear part, of a return-bottom having an upwardly-projecting portion at its rear part arranged behind and overlapping the bottom edge of the said board, thereby preventing grain from being wasted, substantially as set forth.

In testimony whereof I affix my signature in presence of two witnesses.

EZRA G. CLYMANS.

Witnesses:
G. ARVID ANDERSON,
DANIEL S. BEARD.